US005630489A

United States Patent [19]

Bebernes

[11] Patent Number: 5,630,489
[45] Date of Patent: May 20, 1997

[54] ELECTROHYDRAULIC PARKING BRAKE CONTROL SYSTEM FOR PREVENTING BRAKE ENGAGEMENT WHEN VEHICLE IS IN MOTION

[75] Inventor: Thomas D. Bebernes, Ottumwa, Iowa

[73] Assignee: Deere & Company, Moline, Ill.

[21] Appl. No.: 564,530

[22] Filed: Nov. 29, 1995

[51] Int. Cl.⁶ .................................................. B60K 41/26
[52] U.S. Cl. ................... 192/4 C; 192/4 A; 303/3
[58] Field of Search ............................ 192/4 A, 9, 4 C;
303/3, 191; 477/92, 96

[56] References Cited

U.S. PATENT DOCUMENTS

| | | | |
|---|---|---|---|
| 3,136,399 | 6/1964 | Granryd | 192/4 A X |
| 3,985,210 | 10/1976 | Hodge et al. | 188/170 |
| 4,281,388 | 7/1981 | Friend et al. | 364/565 |
| 4,660,696 | 4/1987 | Kusaka | 192/4 A |
| 4,664,247 | 5/1987 | Wolf et al. | 192/9 X |
| 5,050,936 | 9/1991 | Tanaka et al. | 303/3 |
| 5,052,532 | 10/1991 | Plate | 192/4 A |
| 5,203,616 | 4/1993 | Johnson | 303/10 |
| 5,370,449 | 12/1994 | Edelen et al. | 188/170 X |

OTHER PUBLICATIONS

Deere & Co., Operator's Manual OM–W38925, cover page and selected pages 15–1, 15–5, 30–2, 30–3, 35–1, 65–41, 65–42 and 65–43, dated 1987, published in the U.S.A.

*Primary Examiner*—Rodney H. Bonck

[57] ABSTRACT

A vehicle has a parking brake system including spring-applied, pressure-released brakes. An electrohydraulic control system is provided for selectively energizing a solenoid-operated brake control valve so that release pressure is supplied to the brakes when the transmission control lever is not in neutral or when the vehicle tachometer is indicating a ground speed other than zero.

7 Claims, 1 Drawing Sheet

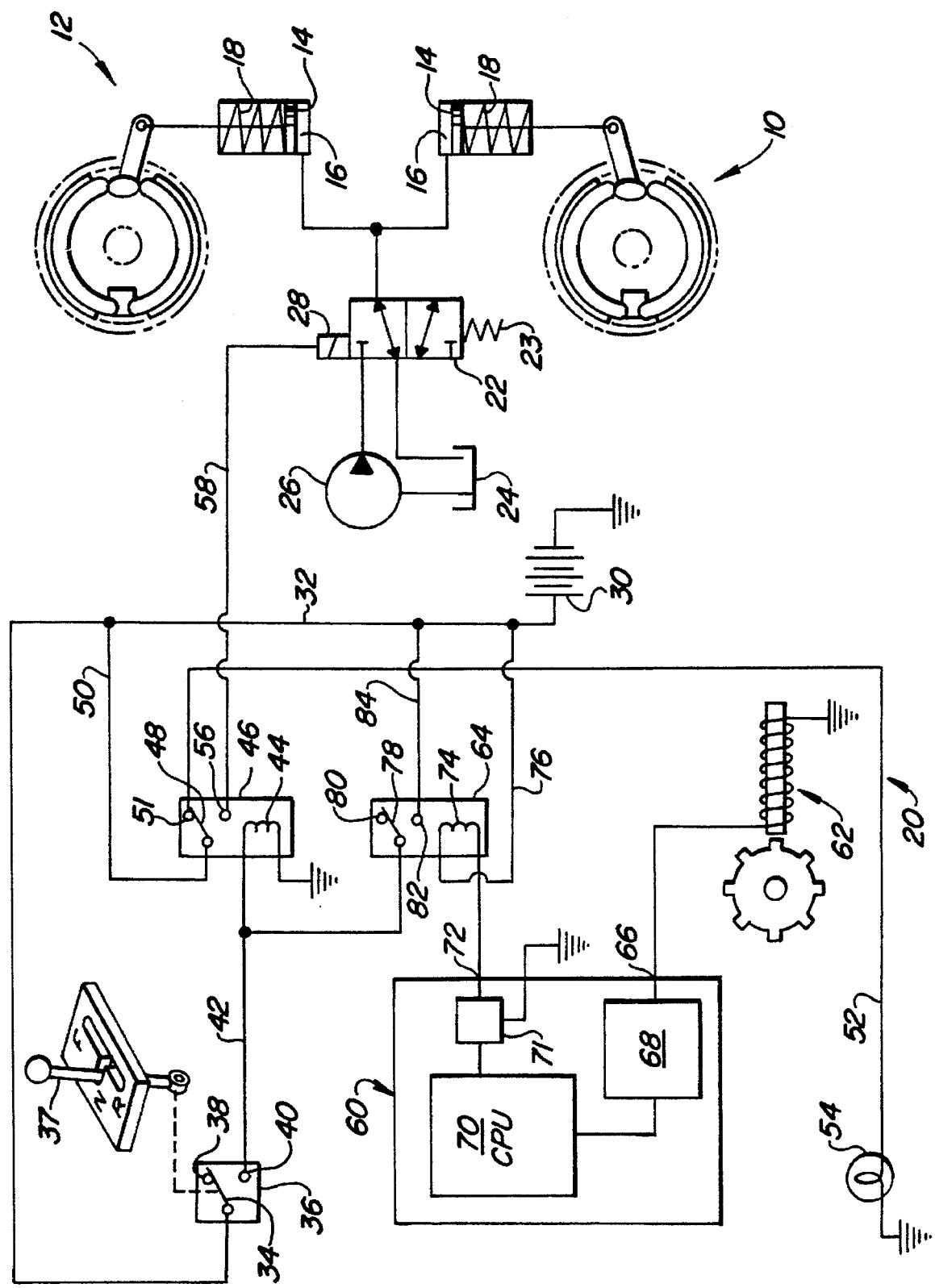

ELECTROHYDRAULIC PARKING BRAKE CONTROL SYSTEM FOR PREVENTING BRAKE ENGAGEMENT WHEN VEHICLE IS IN MOTION

BACKGROUND OF THE INVENTION

The present invention relates to vehicle parking brakes and more specifically relates to a system for controlling spring-applied, hydraulically released parking brakes.

A known self-propelled agricultural vehicle has a pair of driven ground wheels and is equipped with a braking system including a pair of lever-actuated parking brakes respectively associated with the pair of driven ground wheels. While operators are instructed to set or engage the parking brakes when the vehicle is parked, such action is not always taken creating the hazard of the vehicle possibly rolling unattended and causing property damage and/or physical injury. Interlocks are commonly provided, however, for preventing the vehicle engine from being started unless the parking brake lever is first placed in its brake-engage position.

In order to eliminate the problem of operators forgetting or neglecting to set or engage the parking brakes when parking a vehicle, it is known to automate this function by providing vehicles with parking brakes that are spring-engaged and hydraulic pressure-released. The source of fluid pressure for disengaging these brakes is usually provided by an engine-driven pump so that any time the engine is shut down the brakes are automatically engaged. These systems also include an interlock with the vehicle transmission shift lever which results in the brakes being automatically engaged any time the shift lever is moved to its "neutral" position. Thus, the parking brakes are set any time the vehicle is parked with the transmission in neutral and the engine running. Because it is possible that the vehicle may be rolling when the transmission shift lever is placed in its "neutral" position, the known brake system includes an auxiliary ground wheel driven pump that provides sufficient fluid pressure to keep the brakes disengaged until the vehicle has slowed to a predetermined speed. Such a braking system is disclosed in U.S. Pat. No. 5,203,616 granted to Douglas Johnson on 20 April 1993.

A drawback of the patented system is that the components used for preventing brake engagement when the vehicle speed is excessive for braking add a significant cost to the system, and engagement of the brakes at even a slow speed has been found to result in jerking which is uncomfortable to the operator.

SUMMARY OF THE INVENTION

According to the present invention there is provided an improved control system for spring-applied, pressure-released parking brakes.

A broad object of the invention is to provide a parking brake control system for automating the engagement of the parking brakes to ensure that the brakes will be engaged whenever the vehicle is parked with or without the engine running, while preventing the brakes to be engaged so long as the vehicle is in motion.

A more specific object of the invention is to provide an electrohydraulic control system which incorporates the vehicle tachometer, the tachometer acting to complete a circuit for actuating a solenoid-operated parking brake control valve so that pressure is supplied to keep the brakes released whenever the vehicle ground speed indicated by the tachometer is other than zero.

These and other objects will become apparent from a reading of the ensuing description together with the appended drawing.

BRIEF DESCRIPTION OF THE DRAWINGS

The sole FIGURE is a schematic diagram of an electrohydraulic control system for controlling the operation of spring-applied, pressure-released parking brakes.

DESCRIPTION OF THE PREFERRED EMBODIMENT

Referring to the drawing, there is shown a parking brake system including identical right- and left-hand parking brakes 10 and 12, respectively, each including a piston 14 slidably mounted in a cylinder with a release-pressure chamber 16 located at one side, and with a brake-engaging spring 18 located at another side, of the piston.

An electrohydraulic control system 20 is provided for controlling the flow of brake-release pressure fluid to and from the release-pressure chambers 16. Specifically, the control system 20 includes a solenoid-operated, two-position brake control valve 22 movable between a brake-engage position, as shown, to which it is biased by a biasing spring 23 and in which it couples the release-pressure chambers 16 to a sump 24 while blocking them from pressure supplied by an by an engine-driven, release-pressure supply pump 26. An electrical circuit for selectively supplying power to a solenoid 28 of the brake control valve 22 includes a power source, here shown as a battery 30. A power supply lead 32 is connected between the battery 30 and a switch element 34 of a transmission neutral switch 36, the latter being positioned so that a transmission control lever 37 engages and moves the element 34 against an "off" or "neutral" contact 38, as shown, only when the lever is in its "neutral" position. The neutral switch 36 also includes an "on" or "not neutral" contact 40. A lead 42 is connected between the "on" contact 40 and a grounded relay coil 44 of a parking brake relay switch 46, the latter having a switching element 48 connected to the power supply lead 32 by a branch lead 50. When the relay coil 44, and hence the switch 46, is deactivated, the switch element 48 is connected to a first relay contact 51, as shown, which is connected by a lead 52 to a grounded brake light 54. The relay switch 46 includes a second relay contact 56 connected, by a lead 58, to the solenoid 28 of the brake control valve 22.

Thus, when the transmission control lever is not in its "neutral" position, the switch element 34 of the neutral switch 36 will be in contact with the "on" contact 40 so as to complete a power circuit to energize the relay coil 44 and cause it to pull the switching element 48 into engagement with the second relay contact 56 so as to complete a power circuit to the valve solenoid 28. The actuated solenoid 28 will cause the brake control valve 22 to be shifted, against the bias of the spring 23, to its brake-release position coupling the pump 26 in fluid communication with the release-pressure chambers 16 of the cylinders of the parking brakes 10 and 12.

To keep the parking brakes 10 and 12 from being set even when the transmission control lever is in its "neutral" position, if the vehicle ground speed is greater than a preselected minimum speed, a ground speed signal processing device in the form of a digital tachometer 60, a ground speed sensing device 62 and a tachometer output or ground speed relay switch 64 are coupled in the control circuit. Specifically, the tachometer 60 includes a port 66 coupled to the ground speed sensing device 62 which generates and sends the tachometer an electrical signal representative of the vehicle ground speed. The tachometer 60 includes a central processing unit (CPU) 70 having an output connected to a grounding switch 71, the CPU 70 being programmed to send a signal to the grounding switch 70 to cause the latter to connect a port 72 to ground in the event the ground speed is above a preselected minimum value (U.S. Pat. No. 4,281,388 granted to Friend et al on 28 July 1981 discloses a tachometer having a signal-shaping circuit and CPU). The preselected ground speed value is preferably zero but may be some small amount greater than zero. In any event, the second port 72 is coupled to a ground side of a coil 74 of the tachometer output relay switch 64, the power side of the coil being coupled to the power supply lead 32 by a branch lead 76. The relay switch 64 includes a switching element 78 that is normally coupled to an "off" contact 80 when the coil 74 is de-energized, as shown. When the vehicle is in motion, the coil 74 will be energized causing the switching element 78 to be pulled into engagement with an "on" contact 82 which is connected to the power supply lead 32 by a branch lead 84.

Accordingly, when the transmission neutral switch 36 is in its "off" or "neutral" position, as shown, engagement of the parking brakes 10 and 12 will be prevented if the vehicle is rolling since this movement will be sensed by the speed sensing device 62 which will generate and send a signal to the tachometer 60, the latter acting to process the signal and to effect actuation of the switch 71 to connect the coil 74 to ground resulting in the coil being energized causing the switching element 78 of tachometer output relay switch 64 to be moved to complete a circuit energizing the coil 44 of the parking brake relay switch 46 resulting in its switching element 48 being moved to establish a circuit through the brake control valve solenoid 28. The brake control valve 22 then shifts to its brake-release position coupling the pump 26 to the release-pressure chambers 16 so that the parking brakes remain disengaged. This assures that, in the case where the transmission is a dual-path hydrostatic transmission, the hydrostatic pumps are completely destroked so they do not push against the brakes, and also assures that the vehicle is completely stopped before the brakes are applied so as to prevent uncomfortable jerking and unnecessary loads to the brake components.

I claim:

1. A parking brake system including at least one spring-applied, hydraulic pressure-released brake having a pressure chamber for receiving release-pressure fluid; a source of fluid pressure; a sump; a parking brake control valve coupled to said chamber source of fluid pressure and sump and being movable between brake-engage and brake-release positions respectively coupling said chamber to said sump and source of fluid pressure; said control valve including a spring biasing the valve to said brake-engage position and a solenoid energizable for moving the valve to said brake-release position; an electrohydraulic control for said parking brake control valve comprising an electric power source; a transmission shift lever movable among a neutral position and various forward or reverse positions; a parking brake relay switch including a switching element coupled to said power source, a contact coupled to said solenoid and a coil energizable for connecting said switching element to said contact for completing a circuit to said solenoid; a neutral switch having a switching element connected to said power source and an "on" contact connected to said parking brake relay coil with the switching element being operatively connected to said shift lever so as to be moved to engage said "on" contact to complete a circuit to said relay coil whenever said lever is not in its neutral position; a vehicle ground speed sensing device for generating an electrical signal representative of ground speed; a ground speed relay having a coil connected to said power source, having a switching element connected to said parking brake relay switch coil and having an "on" contact connected to said power source; a ground speed signal processing means connected to said sensing device and to said ground speed relay switch coil and including means responsive to said electrical signal for establishing a completed circuit through said ground speed relay switch coil only if said ground speed signal represents a speed above a predetermined minimum speed, whereby said brake control valve will ensure that the brake remains disengaged even if the transmission shift lever is in its neutral position so long as the ground speed remains above said predetermined minimum speed.

2. The parking brake system defined in claim 1 wherein said ground speed signal processing means is a tachometer.

3. The parking brake system defined in claim 1 wherein said predetermined minimum speed is zero.

4. An electrohydraulic parking brake control system, comprising: at least one spring-applied, pressure-released parking brake including a control pressure chamber; an engine-driven pump for supplying release-pressure; a sump; a parking brake control valve connected to the pump, sump and pressure chamber and including a spring biasing the valve to a normal brake-engage position connecting the control pressure chamber of the parking brake to the sump and including a solenoid which, when actuated, acts to shift the control valve to an actuated brake-release position connecting the control pressure chamber to the pump; a transmission controller movable among a neutral and various forward and reverse speed positions; an electric power source; a neutral switch operatively associated with said transmission controller and movable between an open position, which it occupies when the transmission controller is in its neutral position, and a closed position in response to said transmission controller being removed from its neutral position; a first electrical relay switch means coupled to said neutral switch for being energized upon closure of said neutral switch and being connected to said electric power source and to said solenoid of the parking brake control valve and being switched when energized for completing a circuit to said solenoid to thereby shift the valve to connect release pressure to said parking brake when the transmission controller is removed from its neutral position; a vehicle ground speed sensing means; a second electrical relay switch means coupled to said ground speed sensing means, said electric power source and said first electrical relay switch means; said ground speed monitoring means being responsive to ground speeds above a predetermined minimum ground speed for establishing a circuit energizing said second relay switch means; and said second relay switch means, when energized, completing a circuit for energizing said first relay switch means independent of said neutral switch, whereby said solenoid of said parking brake control valve will be energized to shift said valve to connect release-pressure to said parking brake any time the ground speed exceeds said predetermined minimum ground speed.

5. The electrohydraulic parking brake control system defined in claim 4 wherein said predetermined minimum ground speed is zero.

6. The electrohydraulic parking brake control system defined in claim 4 wherein said ground speed monitoring means includes a speed sensing means for sensing ground speed and producing an electrical signal representative of the ground speed and a signal processing means including a switching means coupled in series between said second relay switch means and ground for establishing a ground connection for said second relay switch means resulting in the energization of the latter when said electrical signal is of a value greater than that representative of said predetermined minimum speed.

7. The electrohydraulic parking brake control system defined in claim 6 wherein said signal processing means is a digital tachometer.

* * * * *